(12) United States Patent
Johnson et al.

(10) Patent No.: US 7,490,291 B1
(45) Date of Patent: Feb. 10, 2009

(54) SYSTEM FOR EMPHASIZING GRAPHICAL COMPONENTS IN COORDINATION WITH MULTIMEDIA INSTRUCTIONS

(75) Inventors: Don B. Johnson, Cedar Park, TX (US); April L. R. Canaday, Austin, TX (US); Robin K. Key, Austin, TX (US)

(73) Assignee: Dell USA, LP, Round Rock, TX (US)

( * ) Notice: Subject to any disclaimer, the term of this patent is extended or adjusted under 35 U.S.C. 154(b) by 869 days.

(21) Appl. No.: 10/245,266

(22) Filed: Sep. 17, 2002

Related U.S. Application Data (63) Continuation of application No. 08/516,367, filed on Aug. 17, 1995, now abandoned.

(51) Int. Cl.
*G06F 3/00* (2006.01)
(52) U.S. Cl. .................. 715/705; 715/704; 715/709; 715/756; 715/716; 715/730; 713/1; 713/2; 713/100
(58) Field of Classification Search .................. 715/705, 715/704, 709, 716, 730, 756; 713/1–2, 100, 713/300
See application file for complete search history.

(56) References Cited

U.S. PATENT DOCUMENTS

| | | | | |
|---|---|---|---|---|
| 5,109,482 A | | 4/1992 | Bohrman | |
| 5,237,648 A | * | 8/1993 | Mills et al. | 715/723 |
| 5,377,319 A | * | 12/1994 | Kitahara et al. | 715/707 |
| 5,442,744 A | | 8/1995 | Piech et al. | |
| 5,524,193 A | | 6/1996 | Covington et al. | |
| 5,535,422 A | | 7/1996 | Chiang et al. | |
| 5,577,186 A | * | 11/1996 | Mann et al. | 715/500.1 |
| 5,684,715 A | * | 11/1997 | Palmer | 348/473 |
| 5,729,252 A | | 3/1998 | Fraser | |

OTHER PUBLICATIONS

Cowart, Robert, Mastering Windows 95, Jan. 1, 1995, SYBEX, pp. 103-105 and 138-142.*
eCampus.com, Mastering Windows 95: Cowart, Robert:078211413X:eCampus.com, Dec. 5, 2005, Internet: http://ecampus.com/bk_detail.asp?isbn=078211413X.*

* cited by examiner

*Primary Examiner*—David Wiley
*Assistant Examiner*—Ryan F Pitaro
(74) *Attorney, Agent, or Firm*—Hayes and Boone, LLP (57) ABSTRACT

A method for providing instructional information during the start-up of a computer is disclosed. The method includes the steps of presenting on a screen a start-up screen presentation, the start-up screen presentation including graphical instructional information as well as other informational portions, presenting on the screen a multimedia instructional presentation, and synchronizing portions of the multimedia instructional presentation with presentation events, the presentation events illustrating information provided by the multimedia instructional presentation.

19 Claims, 7 Drawing Sheets

SYSTEM FOR EMPHASIZING GRAPHICAL COMPONENTS IN COORDINATION WITH MULTIMEDIA INSTRUCTIONS

This is a continuation of U.S. Ser. No. 08/516,367, filed Aug. 17, 1995.

The present disclosure relates to graphical user interfaces and more particularly to the use of graphical user interfaces with multimedia instructions.

BACKGROUND

Personal computer systems in general and IBM compatible personal computer systems in particular have attained widespread use for providing computer power to many segments of today's modern society. A personal computer system can usually be defined as a desktop, floor standing, or portable microcomputer that includes a system unit (also referred to as a host system) having a system processor and associated volatile and non-volatile memory, one or more diskette drives, and a fixed disk storage device; the computer system also includes a display, a keyboard, and a mouse coupled to the system unit. One of the distinguishing characteristics of these systems is the use of a system board to electrically connect these components together. These personal computer systems are information handling systems that are designed primarily to give independent computing power to a single user (or a relatively small group of users in the case of personal computers that serve as computer server systems) and are inexpensively priced for purchase by individuals or businesses.

The original personal computers were controlled by operating systems such as the CP/M operating system supplied by Digital Research and the Disc Operating System (DOS) supplied by Microsoft. A user interacted with these computers by typing purely verbal predetermined commands into the computer. A user accessed information within the computer system (i.e., navigated through the system) by typing commands that instructed the computer to run software programs, to change directories, and to view directories.

In response to these systems and in an attempt to make computers use more intuitive, graphical user interfaces (GUI) that included personal computer navigation systems were developed. These GUI's are exemplified by the System 7 operating system which executes on Apple Macintosh computers and by the Microsoft Windows operating environment which executes on IBM compatible personal computers.

However, while operating systems have become more intuitive, certain parts of the operation of the computer systems have not. One example of a part of the operation of a computer system that is not particularly intuitive is the initial start-up procedure of most computer systems. (Initial start-up is the first time that the system is powered-on.) The initial start-up is especially challenging as this is a part of operation of a computer system to which new users are first exposed. In the prior art, instructions relating to the operation of the computer system were communicated via hard-copy manuals or via text-based screens which appear on the screen of the computer when the computer is powered on.

SUMMARY

It has been discovered that by synchronizing on-line text and graphics with multimedia information, it is possible to advantageously improve communication effectiveness of computer systems. More specifically, when graphical controls are described in a multimedia segment, users can better understand and retain instructions on how to use the graphical controls when the controls and corresponding text are simultaneously emphasized with visual cues during the multimedia segment. The visual cues may include flashing color. It has also been discovered that on-line text and graphics may be synchronized with multimedia information by monitoring the frame number of the video of the multimedia information as it is being played. When a frame is reached that is to be synchronized with another on-screen action, a module that performs the on-screen action is accessed.

In a preferred embodiment, the disclosure relates to a method for providing instructional information during the start-up of a computer. The method includes the steps of presenting on a screen a start-up screen presentation, the start-up screen presentation including graphical instructional information as well as other informational portions, presenting on the screen a multimedia instructional presentation, and synchronizing portions of the multimedia instructional presentation with presentation events, the presentation events illustrating information provided by the multimedia instructional presentation.

Alternatively, in a preferred embodiment, the disclosure relates to a system for providing instructional information during the start-up of a computer system including a screen for presenting information. The system includes a computer readable, non-volatile memory, means for presenting on the screen a start-up screen presentation, the start-up screen presentation including graphical instructional information as well as other informational portions, means for presenting on the screen a multimedia instructional presentation, and means for synchronizing portions of the multimedia instructional presentation with presentation events, the presentation events illustrating information provided by the multimedia instructional presentation.

DETAILED DESCRIPTION

The following sets forth a detailed description of the best contemplated mode for carrying out the invention. The description is intended to be illustrative of the invention and should not be taken to be limiting.

Figure 1:
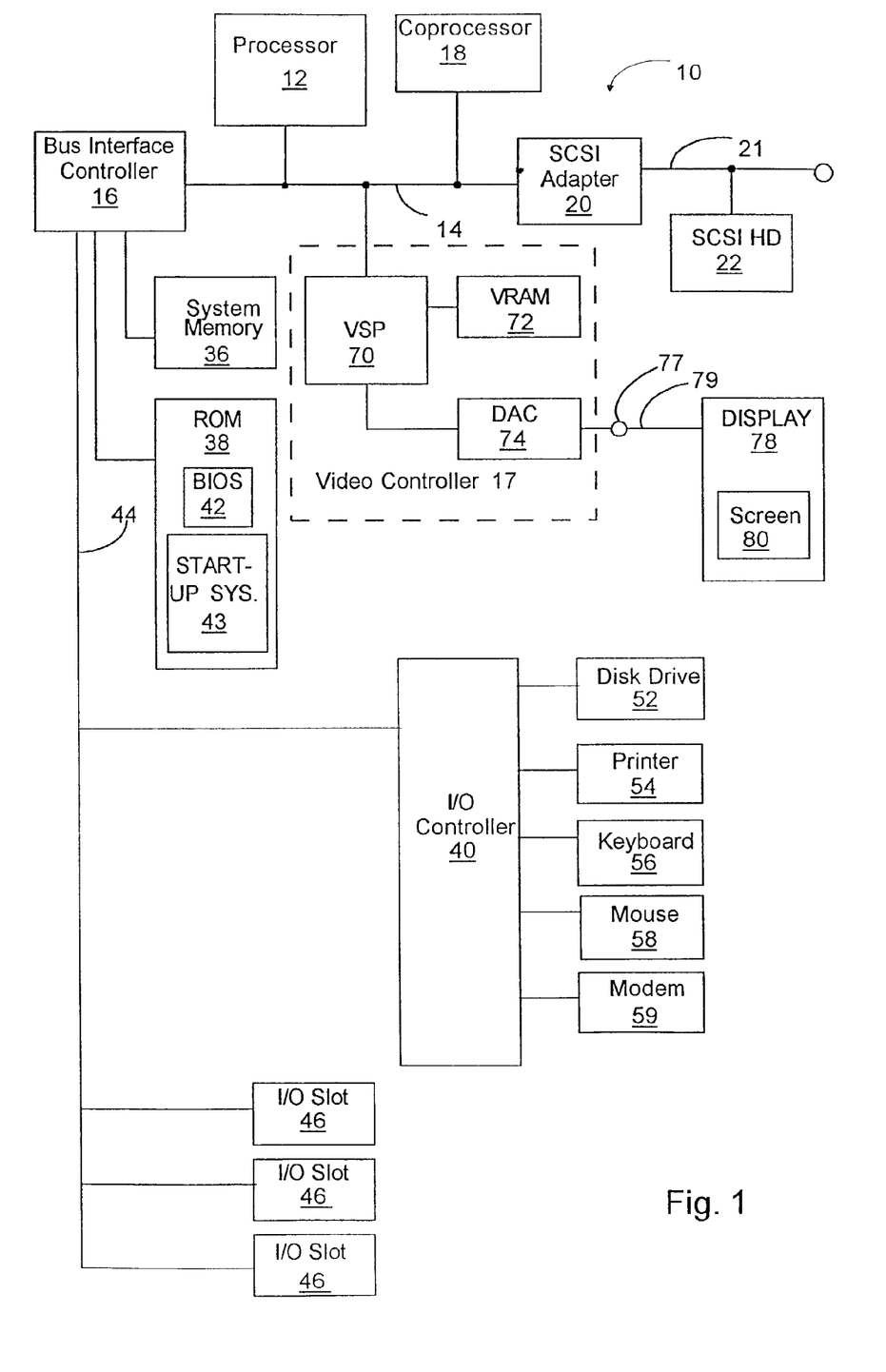
FIG. 1 shows a block diagram of a computer system having a start-up system.

Referring to FIG. 1, personal computer system 10 which presents a graphical user interface in accordance with the present invention is shown. Computer system 10 includes processor 12, coupled to local bus 14 which, in turn, is coupled to bus interface controller 16, coprocessor 18, video controller 17 and small computer system interface (SCSI) adapter 20. Processor 12 is preferably a microprocessor from the family of x86 processors, such as a Pentium microprocessor available from Intel Corporation, Santa Clara, Calif.

Local bus 14 includes conventional data, address and control lines conforming to, for example, the peripheral connect interface (PCI) architecture. SCSI adapter 20 couples local bus 14 to SCSI bus 21 to which SCSI devices such as a SCSI hard drive 22 may be coupled. Host unit 11 also includes system memory 36, non-volatile memory 38 and I/O controller 40, which are all coupled to bus interface controller 16.

Bus interface controller 16 performs two primary functions. The first function that bus interface controller 16 performs is as a memory controller for accessing main system memory 36 and nonvolatile memory 38. Main system memory 36 is a dynamic random access memory (RAM) which includes one or more single, in-line memory modules (SIMMS) and stores programs and data for execution by system processor 12 and coprocessor 18. Nonvolatile memory 38 is, e.g., a read only memory (ROM) which stores microcode including the basic input output system (BIOS) 42 of computer system 10. Nonvolatile memory 38 also stores start-up system 43 which, when executed, provides a user with an introduction to the use of computer system 10.

BIOS 42 is a microcode software interface between an operating system or application programs and the hardware of system 10. The operating system and application programs access BIOS 42 rather than directly manipulating I/O ports and control words of the specific hardware. BIOS 42 is accessed through an interface of software which interrupts and contains a plurality of entry points corresponding to the different interrupts. In operation, BIOS 42 is loaded from ROM 38 to system memory 36 and is executed from system memory 36.

The second function that bus interface controller 16 performs is as an interface between bus 14 and input/output (I/O) bus 44. I/O bus 44 conforms to the industry standard architecture (ISA) standard, which is also sometimes referred to as the AT bus standard. Bus 44 is further coupled to I/O controller 40, and a plurality of I/O slots 46, into which a variety of I/O or expansion cards (not shown) may be inserted.

I/O controller 40 is also coupled to and controls the operation of disk drive 52, printer 54, keyboard 56 and mouse 58. I/O controller 40 also includes a modem port to which a modem 59 may be optionally connected.

Video controller 17, which is coupled to local bus 14, includes video signal processor (VSP) 70, video RAM (VRAM) 72 and digital to analog converter (DAC) 74. Video signal processor 70 is coupled to video RAM (VRAM) 72 and to digital to analog converter (DAC) 74. Digital to analog converter 74 is coupled to display terminal 77. Display 78, which is a computer display device conforming to, e.g., the super video graphics array (SVGA) standard, is coupled to display terminal 77 via display cable 79. Display 78 includes screen 80 on which video information such as a graphical user interface is presented.

Figure 2:
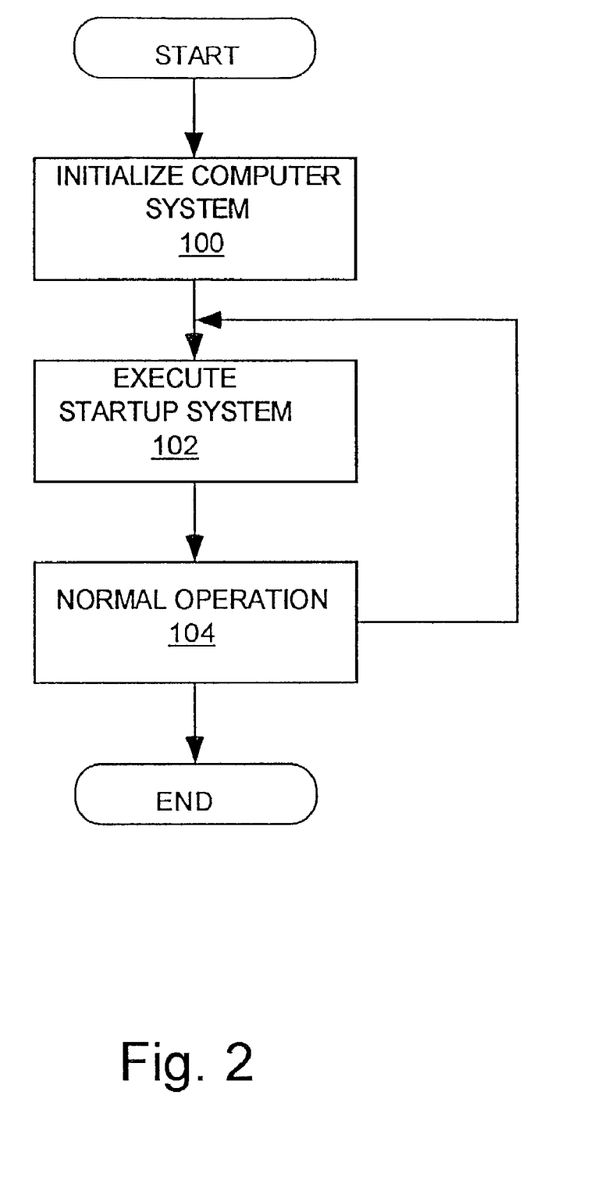
FIG. 2 shows a flow chart of the operation of an initialization system of a computer system.

Referring to FIG. 2, when computer system 10 is first powered on, computer system 10 is initialized at initialize computer system step 100. After the system is initialized, control transition to execute start-up step 102, during which start-up system 43 is loaded into random access memory 36 and executed by processor 12. While start-up system 43 is being executed by processor 12, processor 12 causes start-up screen presentations to be presented on screen 80 of display device 78. Prior to being loaded into memory 36 for execution, start-up system 43 may be stored on any type of computer readable, non-volatile memory such read only memory 38 or disk drive 52.

After execution of start-up system 43 is complete, control transfers to normal operation step 104, during which computer system 10 operates as is well known in the art. During normal operation step 104, a user may cause transfer back to execute start-up system step 102 to, for example, obtain assistance in understanding the operation of computer system 10.

Figure 3:
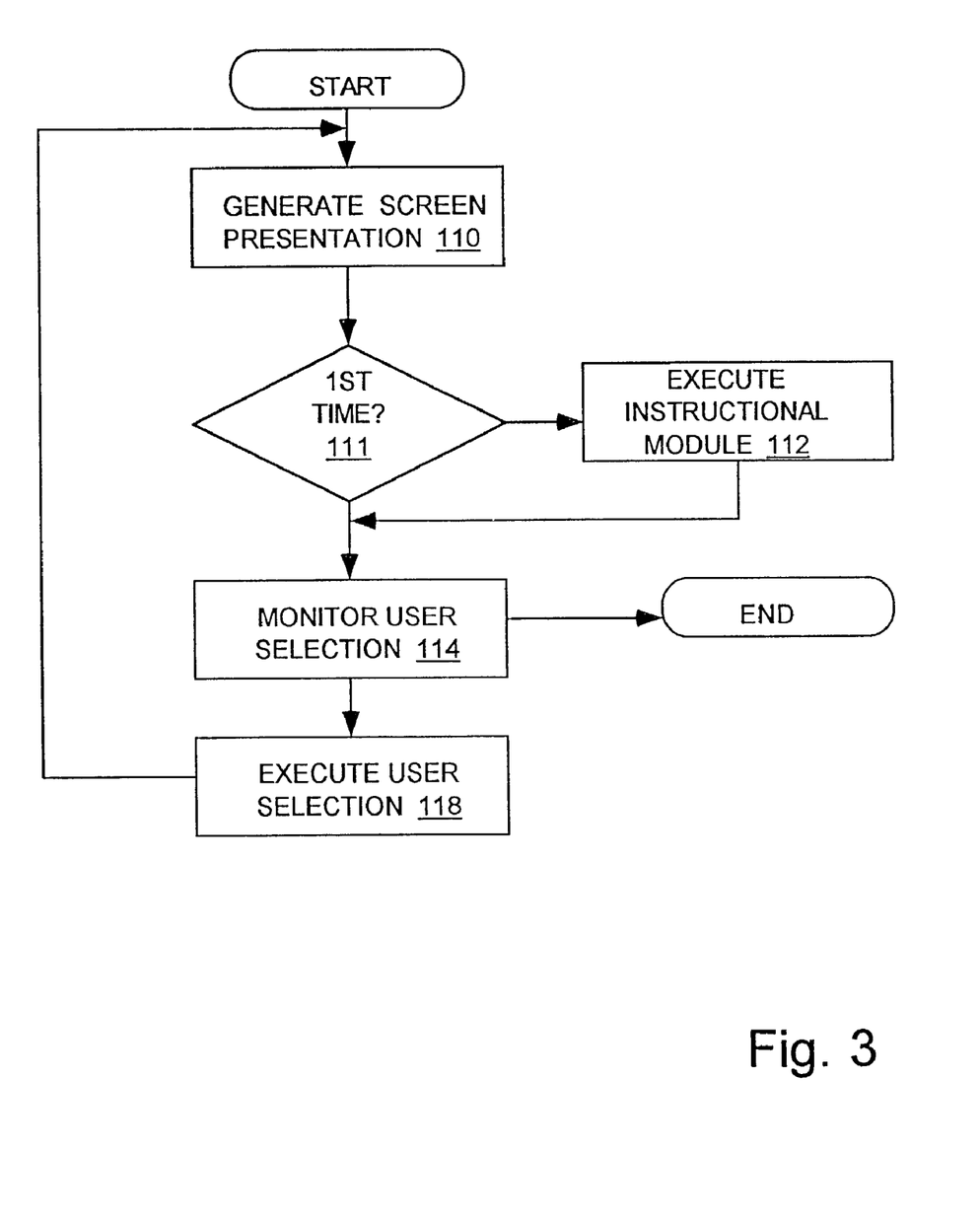
FIG. 3 shows a flow chart of the operation of the start-up system of the initialization system of FIG. 2.

Referring to FIG. 3, when control transfers to execute start-up system step 102, an initial start-up screen presentation is presented by screen 80 at generate screen presentation step 110. After the initial start-up screen presentation is presented, control transfers to first time executing step 111. First time executing step 111 determines whether this pass through start-up system 43 is the first time that start-up system 43 is executed. If it is the first time, then control transfers to execute instructional module step 112. If this pass through the start-up system 43 is not the first time that the start up system is executed, then control transfers to monitor user selection step 114.

During execute instructional module step 112, processor 12 causes an instructional module to be executed which provides initial instructions relating to the operation of computer system 10 as well as instructions on how to obtain further information about the operation of computer system 10. These initial instructions are provided as multimedia information, including motion video along with corresponding audio instructions so that even novice computer users are able to understand the initial instructions. Additionally, events on the screen presentation are synchronized with the multimedia information to provide further assistance in understanding the initial instructions by accenting particular parts of the screen presentation.

The initial instructions include an audio instruction to actuate, e.g., by clicking a button icon, an exit button if a user wishes to exit start-up system 43. After the initial instructions are presented, control transitions to monitor step 114, during which computer system 10 determines whether a user actuates the exit button. If a user does actuate the exit button, then execution of the start-up system completes and control transfers to normal operation step 104. If a user selects another button, then control transfers to execute user selection step 118. During execute user selection step, the module associated with the actuated button is executed. One of the modules which may be selected by a user is the initial instruction module. Other modules which may be selected provide additional information relating to the operation of computer system 10.

After the selected module is executed, control transfers to initial screen presentation step 110, during which the initial screen presentation is again presented on screen 80, and ultimately back to monitor user selection step 114.

Figure 4A:
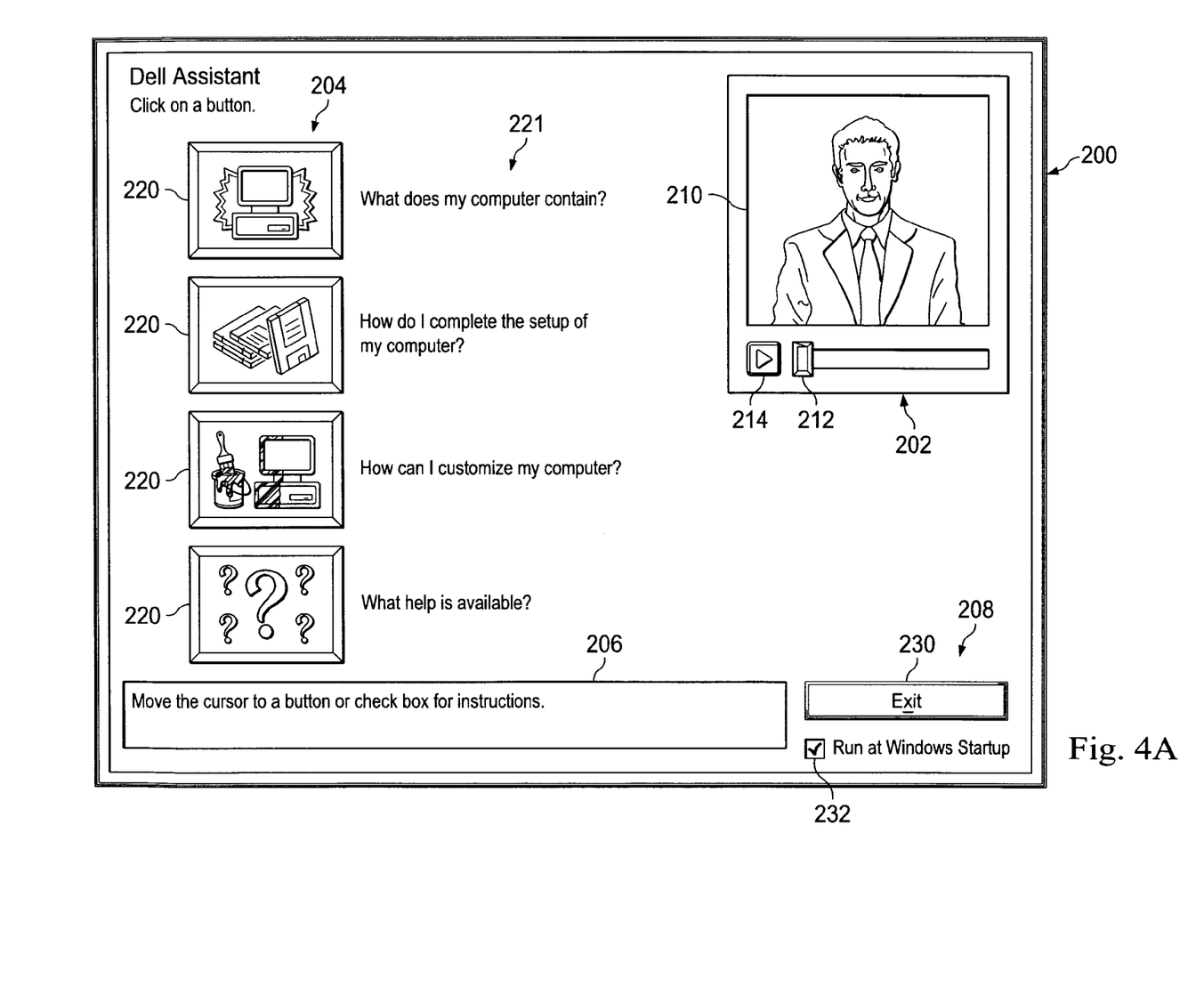
FIGS. 4A-4C show screen presentations of a start-up system of FIG. 2.
Figure 4B:
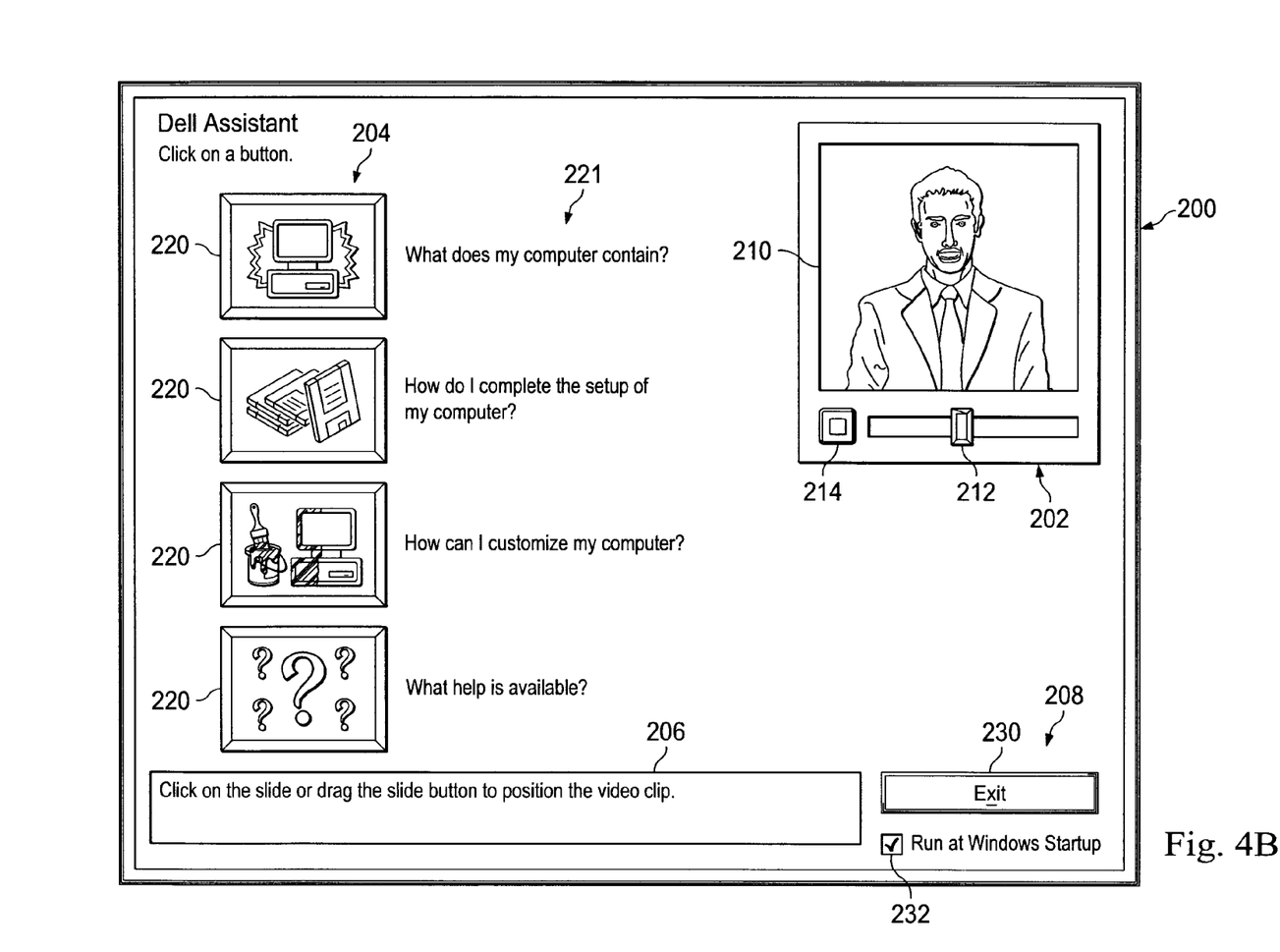
Figure 4C:
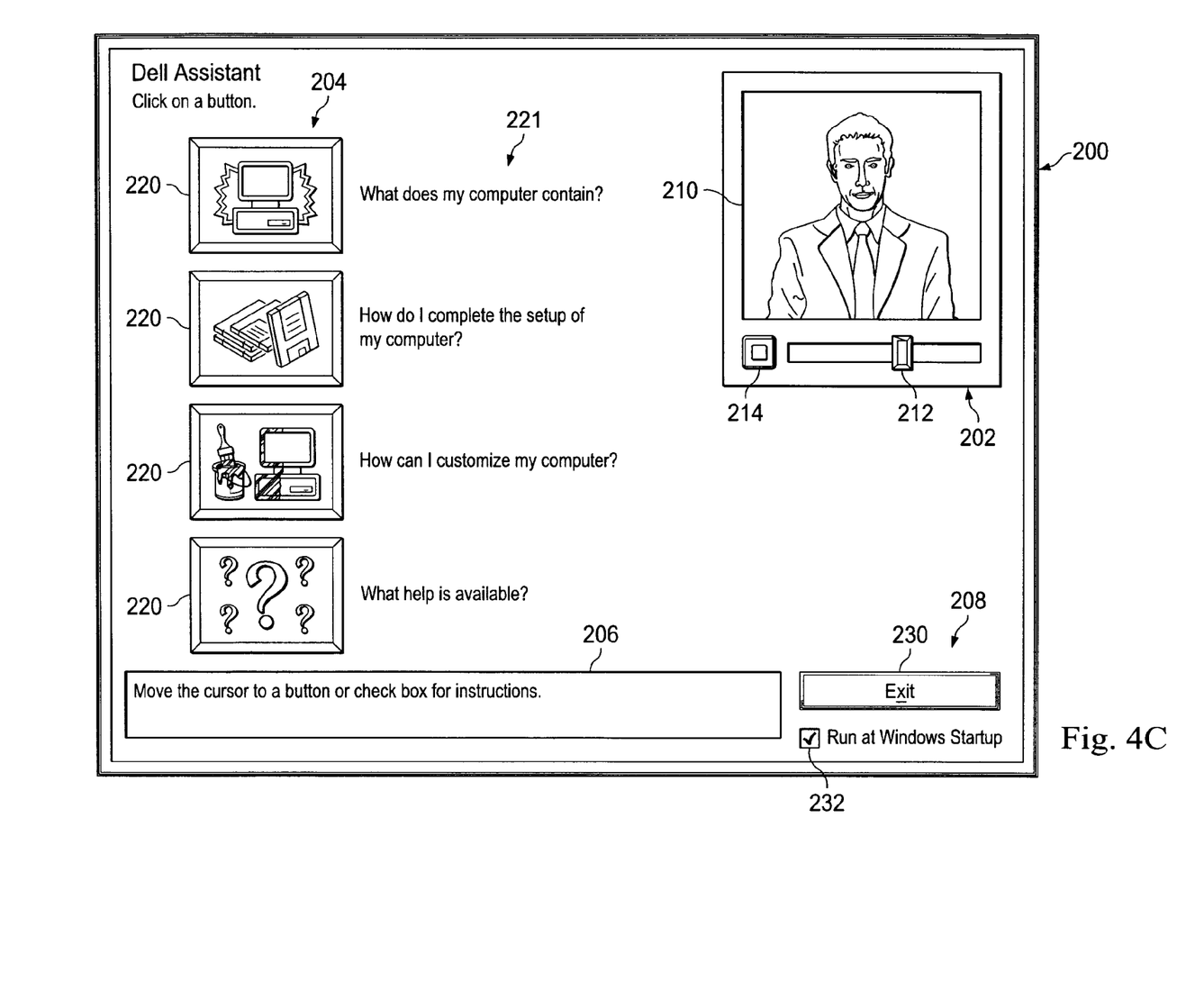

FIGS. 4A-4C show examples of the initial screen presentations of the initial start-up system 100. The screen presentation is presented for example on screen 80 of display device 78 under control of processor 12. The screen presentations are presented with a 2½ dimensional effect. I.e., the screen presentations include representations of raised buttons that may be actuated by, for example, pressing the buttons.

More specifically, initial screen presentation 200 includes motion video portion 202, selection portion 204, informational portion 206 and exit portion 208. Motion video portion 202 includes motion video window 210 in which the motion video portion of the instructional module is presented. Motion video portion 202 also includes slider control 212 which indicates the part of the instruction module presently being presented. Motion slider control 212 may be actuated to change the portion of the multimedia presentation being presented. When actuating the motion slider control 212, the video portion of the multimedia presentation moves in synchronism with slider control. I.e., if the slider is moved quickly, then the video portion of the multimedia presentation moves through the frames of the video quickly and if the slider is moved slowly, then the video portion of the multimedia presentation moves through the frames of the video slowly. Motion video portion 202 also includes control button 214. Control button 214 enables a user to toggle between starting and stopping the multimedia presentation which is presented in motion video window 210. At a given time, control button 214 includes a presentation of one of a plurality of symbols. More specifically, when the multimedia presentation is stopped, this button includes a presentation of a start symbol, which is, e.g., analogous to a video cassette player start symbol (see, e.g., FIG. 4A). When the multimedia presentation is being presented, control button includes a presentation of a stop symbol, which is, e.g., analogous to a video cassette player stop symbol (see, e.g., FIG. 4B).

Selection portion 204 includes a plurality of large, easy to actuate (e.g., by a single mouse click) buttons 220. The buttons include graphics which indicate the functions of the buttons 220. Additionally, along side each button is corresponding text 221. The corresponding text 221 sets forth in more detail what action may be obtained by actuating the corresponding button. For example, the text may set forth what the computer contains, how to complete the setup of the computer, how to customize the computer and what help is available for the computer user.

Informational portion 206 provides textual information relating to the operation of computer system 10. This textual information is context sensitive relating to the location of a cursor on screen 80. For example, when the cursor is not located over an actuatable area, the textual information sets forth "move cursor to a button or check box for instructions". When the cursor is located over an actuatable area such as over the "what does my computer contain" button 220, the textual information sets forth "Click here to display information about your computer". When the cursor is located over the "How do I complete the setup of my computer?" button 220, the textual information sets forth "Click here for the steps you should complete before you proceed". When the cursor is located over the "How can I customize my computer?" button 220, the textual information sets forth "Click here to set up your system performance". When the cursor is located over the "What help is available?" button 220, the textual information sets forth "Click here to access tutorials, answers to commonly asked questions and more".

Exit portion 208 includes exit button 230 as well as control box 232. Control box 232 is selectable to control whether start-up system 43 is executed upon initialization of computer system 10.

In operation, as the instructional module is executing and providing the motion video and synchronized audio, selection portion 204 and informational portion 206 are synchronized with the multimedia information. For example, if the audio portion states to press exit button 232 to exit the start-up system, start-up system 43 causes exit button 232 to be accented (e.g., by changing the color of the button to create a highlight effect) to better indicate the button being referenced. Also for example, if the audio portion states that a button may be selected to obtain more information about the computer system 10, then buttons 220 of selection portion 204 are accented to better indicate that these are the buttons being referenced. See, for example, FIG. 4B. Also for example, if the audio portion states that information regarding the operation of computer system 10 is set forth in information portion 206, then information portion 206 is highlighted to better indicate the location of the information section. See, for example, FIG. 4C.

Figure 5:
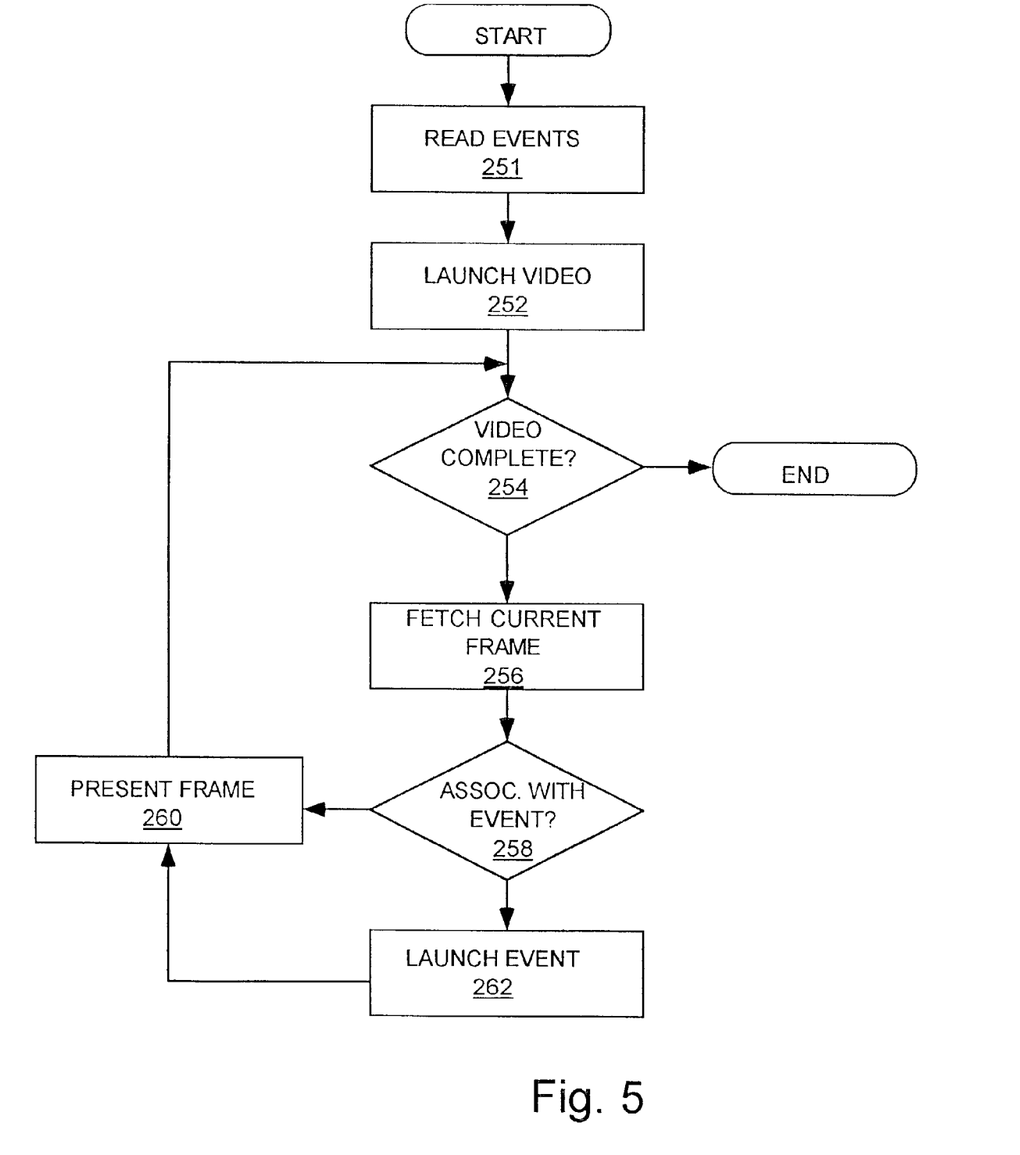
FIG. 5 shows a flow chart of the event synchronization system of the start-up system of FIG. 2.

Referring to FIG. 5, instructional module 112 includes synchronization module 250 which synchronizes the video with screen events. As is known in the art, motion video is a sequential presentation of still frames which when sequentially presented provide the appearance of motion. These frames are stored in memory with associated video frame numbers.

In operation, synchronization module 250 starts by reading and determining events which are to occur during the motion video presentation. These events are stored within start-up system 43 and relate to information that is presented via the multimedia presentation. After the events are read from start-up system 43 during read events step 252, the video presentation is launched, i.e., starts executing, at launch video step 252. Once the video is launched, it is checked to determine whether the video presentation is complete, i.e., whether the final frame has been presented, at video complete step 252. If the video is complete, the synchronization module 250 is complete.

If the video is not complete, the synchronization module 250 fetches the current frame of video. After the frame is fetched, the frame number is compared to the list of events to determine whether an event is associated with the frame. If there is not an event associated with the frame, the frame is presented on screen at present frame step 260 and control transfers to video complete determination step 254. If the frame is associated with an event, then control transfers to launch event step 262. At launch event step 262 the event is launched and control transfers to present frame step 260, thus causing execution of the event to be synchronized with the presentation of the frame of video. After the event is executed and the frame is presented then control transfers to video complete setup 254. When the video is complete then the synchronization module completes and control returns to monitor user selection step 114 (see FIG. 3).

OTHER EMBODIMENTS

Other embodiments are within the following claims.

For example, while in the preferred embodiment, the screen events are synchronized with the video portion of the multimedia presentation, it is possible that these events would be synchronized with the motion video portion of the multimedia presentation.

What is claimed is:

1. A method for providing instructional information for a user during a first time that a computer system is powered on, the method comprising:

determining if a computer system is being powered on for the first time;

in response to determining that the computer system is being powered on for the first time, automatically presenting to a user of the computer system a start-up screen presentation during a computer set up procedure that occurs when the computer system is powered on for the first time;

presenting in the start-up screen presentation a multimedia instructional presentation including video with corresponding audio and graphical controls, wherein the graphical controls are operable to be emphasized with visual cues during the multimedia instructional presentation;

synchronizing at least one portion of the multimedia instructional presentation with at least one screen event;

wherein the synchronizing comprises determining that a current video frame in the multimedia instructional presentation is associated with the at least one screen event, and executing that at least one screen event in synchronization with the current video frame;

completing the computer set up procedure; and ending the start-up screen presentation.

2. The method of claim 1 wherein the multimedia instructional presentation provides audio instructions.

3. The method of claim 1 wherein the visual cues include accenting portions of the graphical controls.

4. The method of claim 3 wherein the graphical controls include button icons allowing access to additional instructional information.

5. The method of claim 4 wherein the button icons are easy to actuate button icons.

6. The method of claim 3 wherein the graphical controls include an informational portion, the informational portion including a text portion for providing additional instructional information.

7. The method of claim 1 wherein the start-up screen presentation includes a 2½ dimensional effect.

8. The method of claim 1 wherein the multimedia instructional presentation includes a motion video portion.

9. The method of claim 8 wherein the motion video portion includes a motion video window, and the motion video portion of the multimedia instructional presentation is presented within the motion video window.

10. The method of claim 9 wherein the motion video portion includes a slider control, the slider control controlling which part of the multimedia instructional presentation is being presented.

11. The method of claim 9 wherein the motion video portion includes a control button, the control button controlling whether the multimedia instructional presentation is presented.

12. The method of claim 11 wherein the control button includes a presentation of a start symbol when the multimedia instructional presentation is not being presented and a presentation of a stop symbol when the multimedia instructional presentation is being presented.

13. The method of claim 1 wherein the multimedia instructional presentation includes presenting a sequence of still frames on the screen, each still frame including an associated video frame number.

14. A system for providing instructional information for a user during a first time that a computer system is powered on, the system comprising:
   a computer system comprising a readable, non-volatile memory;
   means for determining if the computer system is being powered on for the first time;
   means for automatically presenting to a user of the computer system a start-up screen presentation during a computer set up procedure that occurs when the computer system is powered on for the first time, in response to determining that the computer system is being powered on for the first time;
   means for presenting in the start-up screen presentation a multimedia instructional presentation including video with corresponding audio and graphical controls, wherein the graphical controls are operable to be emphasized with visual cues during the multimedia instructional presentation;
   means for synchronizing at least one portion of the multimedia instructional presentation with at least one screen event, wherein the synchronizing comprises determining that a current video frame in the multimedia instructional presentation is associated with the at least one screen event and executing that at least one screen event in synchronization with the current video frame;
   means for completing the computer set up procedure; and
   means for ending the start-up screen presentation.

15. A method for providing instructional information for a user during first time that a computer system is powered on, the method comprising:
   determining if a computer system is being powered on for the first time;
   in response to determining that the computer system is being powered on for the first time, automatically presenting to a user of the computer system a start-up screen presentation during a computer set up procedure that occurs when the computer system is powered on for the first time;
   presenting in the start-up screen presentation a multimedia instructional presentation, the multimedia instructional presentation including a graphical control and a corresponding text instruction on using the graphical control, wherein the graphical control and corresponding text instruction are simultaneously emphasized with visual cues during the multimedia instructional presentation;
   synchronizing at least one portion of the multimedia instructional presentation with at least one screen event, wherein the synchronizing comprises determining that a current video frame in the media instructional presentation is associated with the at least one screen event, and executing that at least one screen event in synchronization with the current video frame;
   completing the set up procedure; and
   ending the start up screen presentation.

16. The method of claim 15 wherein the at least one screen event emphasizes other informational portions presented on the start-up screen presentation.

17. The method of claim 15 wherein the at least one screen event include accenting portions of the graphical control.

18. The method of claim 15 wherein the graphical control includes a button, the buttons allowing access to additional instructional information.

19. A method for providing instructional information for a user of a computer system, the method comprising:
   determining if a computer system is being powered on for the first time;
   in response to determining that the computer system is being powered on for the first time, automatically presenting to a user of the computer system a screen presentation on a screen of the computer system during a computers set up procedure that occurs when the computer system is powered on for the first time;
   presenting a multimedia instructional presentation on the screen, the multimedia instructional presentation including a description of at least one of a graphical control and a text instruction, wherein one of the graphical control and the text instruction are emphasized with visual cues during the multimedia instructional presentation;
   synchronizing at least one portion of the multimedia instructional presentation with at least one screen event, wherein the synchronizing comprises determining that a current video frame in the multimedia presentation is associated with the at least one screen event and executing the at least one screen event in synchronization with the current video frame;
   completing the computer set up procedure; and
   ending the start-up screen presentation.

* * * * *